United States Patent Office 3,837,971
Patented Sept. 24, 1974

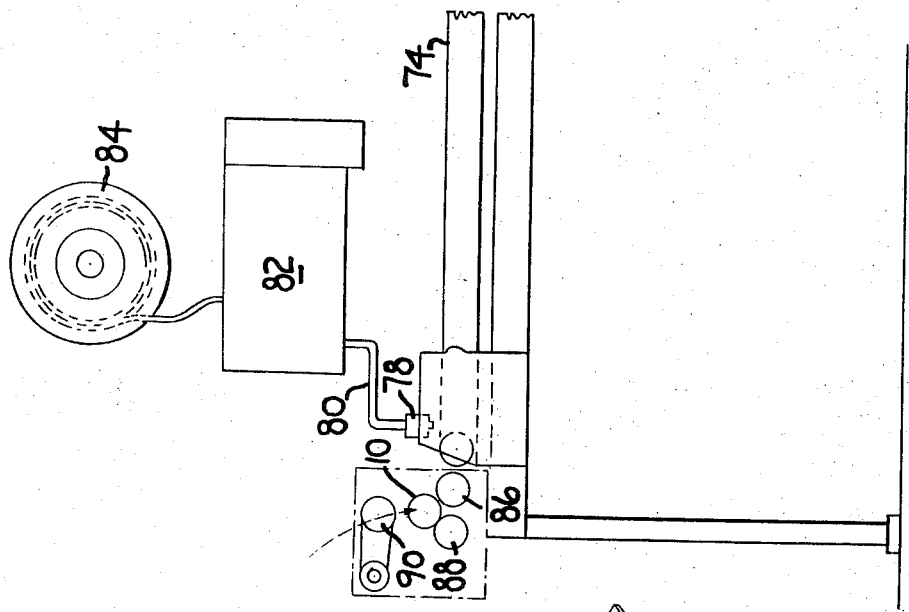

3,837,971
APPARATUS FOR WRAPPING MOLDED PIPE INSULATION
Carl A. Beck, Bala-Cynwyd, Pa., assignor to Certain-Teed Products Corporation, Valley Forge, Pa.
Application July 6, 1971, Ser. No. 159,776, now abandoned, which is a division of application Ser. No. 887,197, Dec. 22, 1969, now Patent No. 3,658,614. Divided and this application Jan. 22, 1973, Ser. No. 325,279
Int. Cl. B65c 9/06; B26d 5/00; B65h 81/00
U.S. Cl. 156—447                                         1 Claim

ABSTRACT OF THE DISCLOSURE

Selected lengths of a first and second sheet material are advanced from their respective sources to a location and in such sequence where one of the materials is above a portion of the other. The upper material has an adhesive side opposed to the lower material. The selected lengths are severed simultaneously, which severing step also at least initially adheres the material together. Glue strips are placed on selected portions of the composite and registry is then made with a length of molded pipe insulation. The insulation is wrapped with the composite covering, the portion having the second strip being part of a flap for subsequent use in securing the insulation around the pipe.

CROSS-REFERENCE TO RELATED APPLICATIONS

This application is a division of copending application Ser. No. 159,776, filed July 6, 1971, now abandoned for "Method and Apparatus for Wrapping Molded Pipe Insulation," which application is a division of application Ser. No. 887,197, filed Dec. 22, 1969, now U.S. Pat. 3,658,614, granted Apr. 25, 1972.

BACKGROUND OF THE INVENTION

Fiber glass pipe insulation is generally produced by wrapping a length of fiber glass mat having an uncured binder therein around a metal mandrel, enclosing the wrapped mandrel in a mold and heating the assembly to cure the binder. The insulation, upon removal from the mold and mandrel, will retain its molded configuration. After being released from the mandrel, the molded product is end trimmed and is cut radially completely through one portion of its wall and partially through the diametrically opposite portion of the wall, such to form a hinge, permitting the molded insulation to be wrapped around a pipe.

In addition, a cloth or paper wrapping or covering is applied and adhered to the outside of the molded insulation. The length of the wrapping or covering is greater than the circumference of the molded insulation, so as to provide a wrap-around flap by which, with the proper adhesive, the insulation may be installed around the pipe.

Traditionally, the wrapping or covering has been applied and adhered to the molded insulation by hand. The worker applies adhesive to selected portions of a pre-cut wrapper, registers the radial cut on the molded insulation with one edge of the wrapper, and rolls the wrapper around the insulation. Generally, the adhesive is applied in spaced paths beginning at one edge of the wrapper and terminating short of the opposite edge thereof, it being remembered that a portion of the wrapper becomes a flap and should be free of the adhesive. With glue paths approximately four inches apart, seven paths are required for a thirty-inch length of insulation.

When this insulation is installed, the installer applies adhesive to the inside of the inside of the flap and seals the insulation in place.

In order to save time for final installation of the pipe insulation, it has been suggested that a pressure-sensitive adhesive strip be applied to the flap of the wrapper. Generally, such a pressure-sensitive adhesive strip is protected by a removable paper covering. When applying the insulation around a pipe, it becomes only necessary to remove the protective covering, i.e., strip the protective paper from the adhesive to expose the adhesive strip which permits the flap to be quickly adhered to the remainder of the wrapper.

A serious problem arises in applying the pressure-sensitive adhesive to the wrapper, it being difficult and very time-consuming to apply a length of the material by hand to an edge of the wrapper.

SUMMARY OF THE INVENTION

According to the invention, a length of pipe insulation is positioned with its radial cut in a determined position, a selected length of a wrapping material is advanced from a source thereof and a second, shorter length of a pressure-sensitive tape is advanced to a position above the wrapping material with its free adhesive portion opposite the surface of the wrapping material. The selected lengths of wrapping material and pressure-sensitive tape are simultaneously severed and the tape is adhered to the wrapping material at the trailing edge of the severed portion thereof.

Because there is at least a hairline adherence of the tape and wrapping material portions next to be advanced and severed because of the cutting step, which adherence is not desirable, separation of these materials is then accomplished, generally by means of a moving bar which contacts the materials to separate them.

The severed materials are then conveyed to a squaring position. Here their position relative to the path of movement, etc., is adjusted in order that the leading edge is perpendicular to the path of movement.

The severed material is then conveyed beneath a plurality of spaced glue nozzles through which molten glue is discharged thereonto. The nozzles are controlled to permit discharge of glue for a certain length of time, so as to apply the glue in strips extending from the leading edge of the severed material to positions short of the trailing edge thereof. Thus, the portion of the wrapper which will become the flap is free of applied glue, only having thereon the adhered strip of pressure-sensitive tape protected by a release strip.

The wrapping with the glue applied thereto is then conveyed into registry with the length of insulation, i.e., the leading edge registers with the radial cut, and the assembly is rotated while mild pressure is applied thereto to adhere the wrapper to the insulation. The finished insulation is then ready for use or for packing for shipping for use.

BRIEF DESCRIPTION OF THE DRAWINGS

FIG. 1A is a schematic illustration of the left-hand portion of an apparatus constructed according to this invention;

FIG. 2 is a detailed side view of the cutting and separating portion of the apparatus of FIGS. 1A and 1B;

DESCRIPTION OF THE PREFERRED EMBODIMENT

Figure 1B:
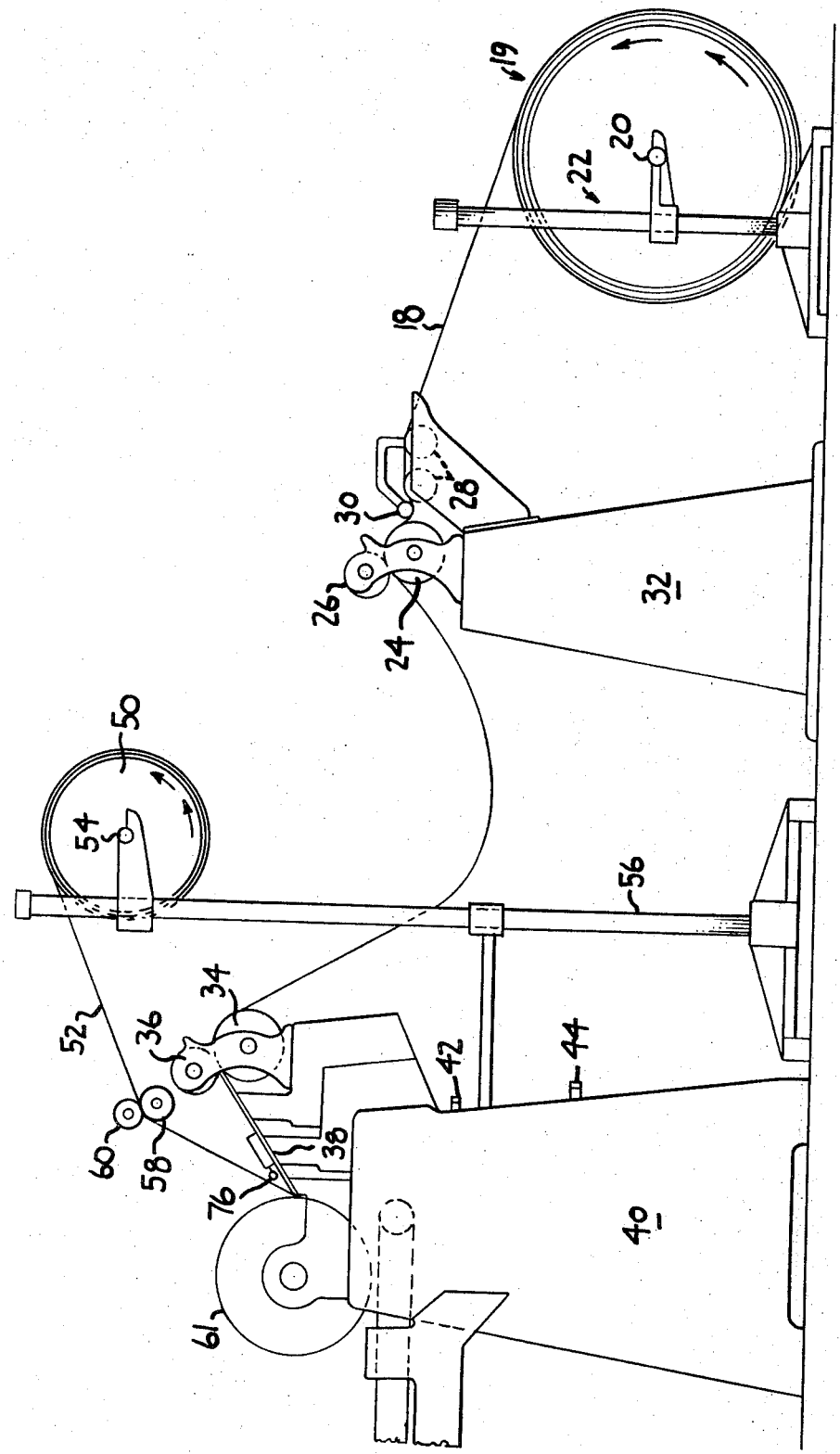
FIG. 1B is a schematic illustration of the right-hand portion of the apparatus according to this invention.

Referring to FIGS. 1A and 1B, there is illustrated a schematic side view of the apparatus of the invention which is constructed and operated to automatically wrap molded fiber glass pipe insulation, one length of which is illustrated as being in proper position for wrapping and which is identified by the reference character 10. The objective of the invention is to apply a covering or wrapper to the length of insulation 10, which wrapper has a flap portion for installing the finished product on a pipe. The finished product is illustrated in FIG. 4 and includes the molded insulation 10, the covering 12 glued to the insulation 10 and having a flap portion 12A with an adhesive strip 14 such that upon removal of the protective cover 16 on the strip 14, the flap may be adhered to the remainder of the covering 12 and complete its installation around the pipe. The covering is a length of cloth or paper material; it may be fiber glass cloth or a paper with or without a metal foil outer surface.

To accomplish the objective of this invention there is provided a source of wrapping material 18 in the form of a roll 19 of wrapping material supported for easy removal by a mandrel 20 passing through the core of the roll 19 and being supported by a support means 22 the details of which can be easily understood by reference to the drawing and thus will not be further described.

Because the feed of wrapping material is an intermittent or cyclic operation, the material is removed from the source by driven mating pre-feed rolls 24 and 26 over idler rolls 28 and through a hold-down roll or bar 30, so as to remove the curl of the wrapping material. The rolls 24, 26, 28 and curl remover roll 30 are suitably supported by a casting 32 and the rolls 24 and 26 may be driven in proper sequence by any suitable, conventional arrangement (not shown).

A pair of mating, driven main feed rolls 34 and 36 deliver the wrapping material 18 to and over a platen 38 for cutting to finite length, as will be described. The feed rolls 34 and 36 and the platen 38 are supported by a casting 40, as illustrated. The rolls 34 and 36 are suitably driven in proper sequence by any suitable, conventional arrangement (not shown). As will become apparent, that length of material 18 fed to extend beyond the platen 38 is severed from the supply.

In order to prevent undue tension on the wrapping material and to insure accurate lengths of sheets cut therefrom, a loop of wrapping material is maintained between the pre-feed rolls 24 and 26 and the main feed rolls 34 and 36. Upper and lower limits of the loop are controlled by a pair of electric eyes 42 and 44 interconnected with the drive for the pre-feed rolls 24 and 26.

A supply roll 50 of pressure-sensitive adhesive material 52 is supported by a mandrel 54 supported in turn by means 56 and a finite length is advanced by driven feed rolls 58 and 60 such that the finite length extends beyond the leading edge of the platen 38 and over and/or above the length of material 18 which is to be severed. This length of adhesive material 52 which extends as described will be severed simultaneously with the material 18. Preferably the pressure-sensitive adhesive comprises an adhesive film or sheet protected on one surface by a removable sheet material which is a release strip in the final product.

The two lengths of material which extend past the platen 38 are simultaneously severed by a cutting apparatus 61 which includes (see FIG. 2) a transverse blade 62 which cooperates with the edge 64 of the platen 38 to make its cut. The edge 64 of the platen thus forms an anvil for the cutting mechanism.

The cutting blade 62 is removably and adjustably connected to a revolving frame 66 pivoted about an axle 68. Suitable driving means (not shown) are employed to rotate the cutting blade, so that the sheet materials are severed. The cutting frame is counterweighted by counterweight 70, so that at the end of a cutting stroke, the frame stops its rotation in a position at which it is re-set for the next cut.

The severed material, i.e., the length of material 18 and the length of adhesive-backed material 52 are at least partially adhered and fall onto moving conveyor belts 74. At the same time, a breaker bar 76 operated by solenoids and in proper sequence is moved to disengage the pressure-sensitive material from the supply and separate it from the material 18, it being understood that the cutting step causes an undesirable hairline adhesion between the materials at their leading edges.

The assembled materials which have been severed are advanced along the conveyor belts to a position short of the location of a plurality of spaced glue nozzles 78 where the severed material is squared, i.e., its leading edge is adjusted to be perpendicular to the path of travel. Any conventional squaring arrangement can be used. After squaring, the materials are advanced beneath the glue nozzles 78 which are operated at the proper time to apply strips of glue to the severed material 18 beginning at the leading edge of the material and terminating short of the trailing edge thereof. The trailing edge, it is to be remembered, includes the pressure-sensitive adhesive protected by removable release strip and forms the flap portion of the finished product.

The glue for the glue nozzles is supplied by pipes 80 from a heated glue unit 82 which is supplied with hot melt adhesive from a reel supply 84. Any suitable supply could be used without departing from the spirit of the invention.

The material with the glue strips is conveyed so that its leading edge registers with the radial cut of the molded pipe insulation 10, the insulation 10 having been inserted in the machine with the radial cut facing downwardly. The insulation is supported by a pair of rotatable rolls 86 and 88 and is retained by a pivoted idler roller 90 which contacts the top of the insulation.

After a short delay to permit partial adherence of the wrapper to the insulation, the rolls 86 and 88 are driven to rotate the insulation and wrap the wrapper therearound it. The driven roller 90 insures adherence. After several rotations, the finished product is removed from the machine, the driven roller 90 being lifted from its insulation contacting position.

Figure 3:
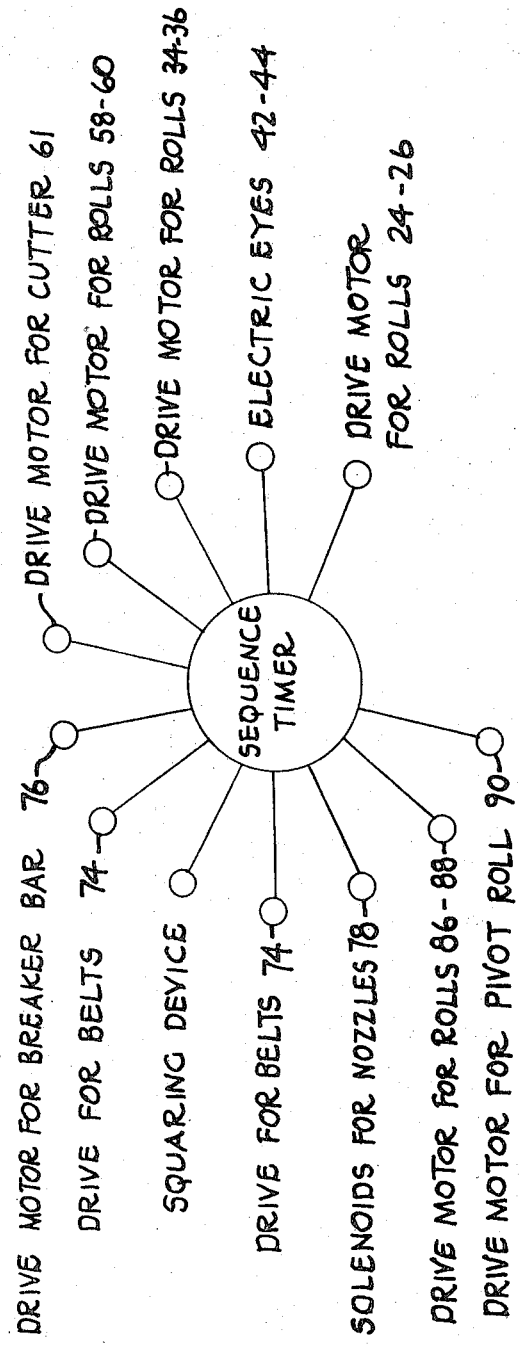
FIG. 3 is a schematic illustration of a control arrangement for the apparatus of FIGS. 1A, 1B and 2, and, FIG. 4 is a perspective illustration of a length of wrapped pipe insulation made with the apparatus and according to the method of this invention.

A suitable operating and control arrangement is illustrated in FIG. 3. Here the central control comprises a sequence timer and operation begins with the drive motor for the rolls 24, 26 and continues, in sequence, counterclockwise to the completion of the operation. Each operation is completed to a controlled amount before the next operation can be initiated.

I claim:

1. Apparatus for wrapping molded pipe insulation including
    a source of a first sheet material,
    a source of a second sheet material, said second sheet material having adhesive on one face thereof,
    means to advance a selected length of said first sheet material from said source thereof,
    means to advance a shorter selected length of said second sheet material from said source thereof to a position over at least a portion of said first sheet material and with said adhesive side positioned over said first sheet material,
    means to sever said selected lengths of material simultaneously and simultaneously adhere the said severed length of said second material to the severed length of said first material,
    means to convey said adhered materials to a location where glue is applied to selected portions of the surface of the first sheet material,
    means to apply said glue to said surface of said first sheet material,
    means to convey said sheet material with the glue applied thereto into registry with a length of molded pipe insulation, and
    means for wrapping said registered sheet material around said molded pipe insulation such that it adheres thereto.

(References on following page)

References Cited

UNITED STATES PATENTS

| | | | |
|---|---|---|---|
| 3,121,253 | 2/1964 | Varrial | 156—455 |
| 3,579,397 | 5/1971 | Schwarzkope | 156—251 |
| 2,958,437 | 11/1960 | Mengis | 156—519 |
| 3,695,965 | 10/1972 | Current et al. | 156—447 |
| 685,780 | 11/1901 | Martin | 161—146 |
| 3,054,440 | 9/1962 | Pio | 156—461 |
| 2,254,394 | 9/1941 | Ratley et al. | 156—353 |
| 3,574,038 | 4/1971 | Wolfe | 156—264 |
| 3,553,046 | 1/1971 | Crawford et al. | 156—184 |
| 2,671,495 | 3/1954 | Iredell et al. | 156—406 |
| 3,583,889 | 6/1971 | Califano et al. | 156—250 |

CLIFTON B. COSBY, Primary Examiner

J. E. KITTLE, Assistant Examiner

U.S. Cl. X.R.

156—159, 187, 192, 251, 355, 522